United States Patent Office 2,955,901
Patented Oct. 11, 1960

---

2,955,901

PROCESS FOR DYEING POLYETHYLENE TEREPHTHALATES

Winfried Kruckenberg, Leverkusen-Bayerwerk, Germany, assignor to Farbenfabriken Bayer Aktiengesellschaft, Leverkusen, Germany, a corporation of Germany No Drawing. Filed July 23, 1957, Ser. No. 673,556

Claims priority, application Germany July 25, 1956

7 Claims. (Cl. 8—41)

The present invention relates to a process for dyeing polyethylene terephthalates; more particularly it relates to the dyeing of said material with dyestuffs of the benzene-azo-benzene, benzene-azo-naphthalene or benzene-azo-pyrazolone series, said dyestuffs being free of sulfonic acid and carboxylic acid groups but containing at least one sulfonamide, substituted sulfonamide or sulfonylamino substituent.

The monoazo dyestuffs to be used according to the present invention are obtainable by combining 1 mol of a diazotized aminobenzene in alkaline, neutral or acid medium with 1 mol of a coupling component of the benzene, naphthalene or pyrazolone series, the diazo and/or coupling components bearing at least one of the above mentioned substituents in the aromatic nucleus or linked to the aromatic nucleus via bridging atoms such as, for example, alkyl, alkylamino or carboxylic acid ester groups. If using amino group containing coupling components, such as amino benzenes which contain alkylsulfonylamino-alkylamino groups, the coupling reaction is carried out in acid solution. The use of azo components, which couple in o-position to an enolic or phenolic hydroxyl group, such as pyrazolones or hydroxynaphthalenes requires an alkaline reaction medium. Some of the dyestuffs used in the present dyeing process are known.

The polyethylene terephthalate material may be dyed in form of fibers, filaments, films, fabrics and like shaped articles. The dyeing process is carried out, if desired, in the presence of swelling agent (carrier) for the polyester material, such as benzoic acid, salicylic acid and the lower alkyl ester thereof or o- or p-phenylphenol, or a dispersing or wetting agent for the dyestuff, at boiling or higher temperature of about 110–140° C.

The dyestuffs are distinguished by a good affinity for polyethylene terephthalate fibers. They yield on this material dyeings of good fastness properties, especially of good sublimation fastness.

Example 1

100 grams of polyethylene terephthalate fibers are dyed for 1½–2 hours at boiling temperature in a dye bath composed of 4 liters of water, 80 grams of benzoic acid and 1 gram of the finely dispersed monoazo dyestuff obtained from diazotized 1-amino-2-chlorobenzene-4-sulfonamide and 1-amino-2-methoxy-5-methylbenzene. The dyed fabric thus obtained is washed alkaline with a solution of 4 milliliters of soda lye (38° Bé.) at 70° C. for 20 minutes, then rinsed with water and dried. It is colored a yellowish shade of good fastness to sublimation and to ironing.

Example 2

1 gram of the monoazo dyestuff obtained by coupling diazotized 1-amino-2,5-dicyanobenzene with N-ethyl-N-(methylsulfonylamino)-ethyl-aminobenzene is finely dispersed and applied within one hour on 100 grams of polyethylene terephthalate fibers at 120° C. without any other addition. The fiber is then colored orange shade having good fastness properties.

Example 3

100 grams of polyethylene terephthalate fibers are dyed for 1½–2 hours in a dye bath composed of 4 liters of water, 4 grams of an emulsifying polyglycol ether, 16 grams of a carrier, such as benzoic acid, 20 grams of diammonium phosphate and 4 grams of the finely dispersed monoazo dyestuff obtained from diazotized 1-amino-4-nitrobenzene-6-sulfodimethylamide and 1-amino-2-methoxy-5-methylbenzene. The dyeing obtained is washed alkaline, rinsed with water and dried. It is colored reddish brown shade of good fastness properties.

When using the dyestuffs of the following table and proceeding as described in Examples 1, 2 or 3, dyeings of good fastness properties are obtained on polyethylene terephthalate fibers.

| | Dyestuff | Shade on polyethylene terephthalate fibers |
|---|---|---|
| (1) | 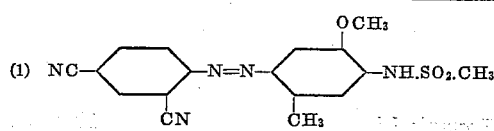 | orange brown. |
| (2) | 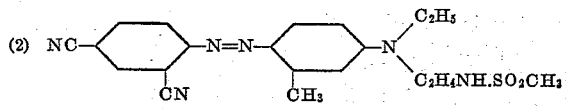 | reddish orange. |
| (3) | 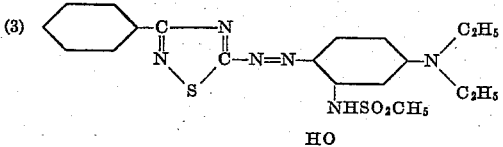 | bluish red. |
| (4) | 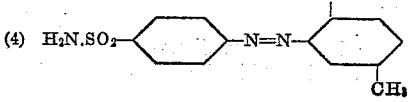 | yellow. |

| Dyestuff | Shade on polyethylene terephthalate fibers |
|---|---|
| (5) 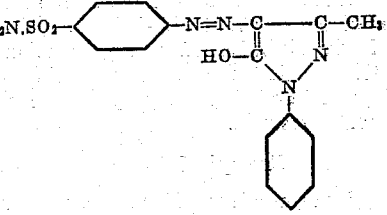 | yellow. |
| (6) 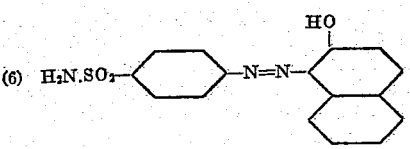 | yellowish orange. |
| (7) 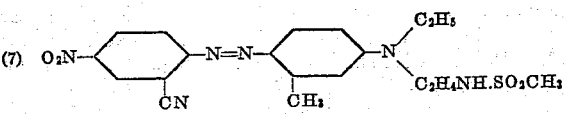 | ruby. |
| (8) 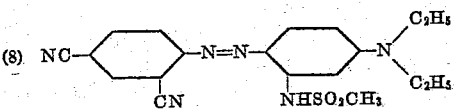 | bluish red. |
| (9) 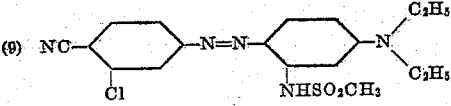 | strongly reddish orange. |
| (10) 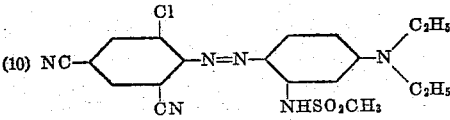 | reddish bordeaux. |
| (11) 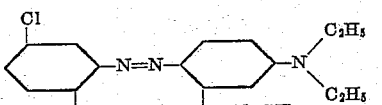 | strongly reddish orange. |
| (12) 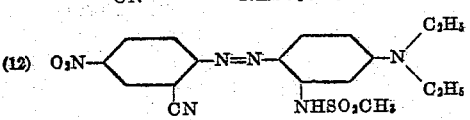 | bluish bordeaux. |
| (13) 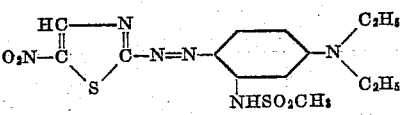 | bluish violet. |

*Example 14*

14.3 grams of 1-amino-2,4-dicyanobenzene are dissolved below 20° C., preferably at 10–15° C. in 45 milliliters of concentrated sulfuric acid and 17 milliliters of nitrosyl sulfuric acid. After about 2 hours this solution is poured into a solution of 24.2 grams of 1-N,N-diethyl-amino-3-N-methyl-sulfonylaminobenzene in 150 milliliters of dilute hydrochloric acid and 400 grams of ice. The reaction mixture is almost neutralized with the addition of soda lye, the precipitated dyestuff filtered with suction and dried. It represents a blackish red powder.

*Example 15*

14.3 grams of 1-amino-2,5-dicyanobenzene are diazotized as described in Example 1 and and combined with 27 grams of 1-methyl-3-N-ethyl-N-(β-methylsulfonylamino-ethyl)-benzene. If proceeding in an analogous manner as in Example 1, one obtains a red dyestuff powder.

*Example 16*

15.25 grams of 1-amino-2-cyano-5-chloro-benzene are diazotized according to instructions given in Example 1 and coupled with 17.8 grams of 1-methyl-3-N-ethyl-N-(β-aminoethyl)-benzene. The mixture is neutralized whereby the dyestuff is kept in solution while adding sodium acetate and acetic acid. Into this solution there are introduced dropwise at 0–20° C. 11.5 grams of methane sulfochloride. After completion of the reaction the precipitated dyestuff is filtered with suction and dried. It represents a yellowish orange powder.

I claim:
1. Process for dyeing polyethylene terephthalates which comprises treating said material with dyestuffs corresponding to the formula

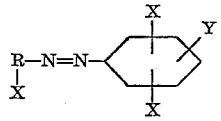

wherein R stands for a diazo component selected from the group consisting of benzene, thiazole and thiodiazol radicals, said radicals being free of sulfonic acid and carboxylic acid groups; Y is selected from the group consisting of sulfonyl amino, sulfonyl amino-lower alkylene-amino, and lower alkylamino; and X is selected from the group consisting of hydrogen, alkyl, alkoxy, and, when Y is lower alkylamino, sulfonyl amino.

2. A process for dyeing polyethylene terephthalates which comprises treating said material with dyestuffs corresponding to the formula

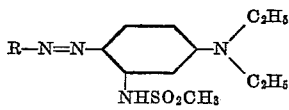

wherein R stands for a diazo component of the benzene series, said diazo component being free of sulfonic acid and carboxylic acid groups.

3. Process according to claim 1, which comprises treating polyethylene terephthalates with the dyestuff corresponding to the formula

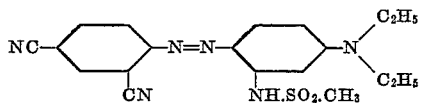

4. Process according to claim 1 which comprises treating polyethylene terephthalates with the dyestuff correponding to the formula

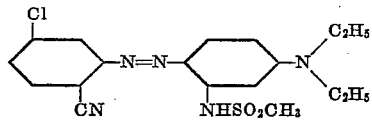

5. A process for dyeing polyethylene terephthalates which comprises treating said material with dyestuffs corresponding to the formula

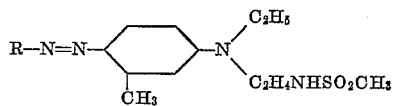

wherein R stands for a diazo component of the benzene series, said diazo component being free of sulfonic acid and carboxylic acid groups.

6. Process according to claim 1 which comprises treating polyethylene terephthalates with the dyestuff corresponding to the formula

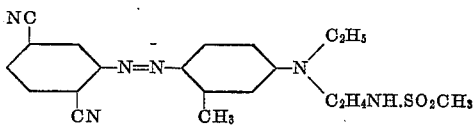

7. Process according to claim 1 which comprises treating polyethylene terephthalates with the dyestuff corresponding to the formula

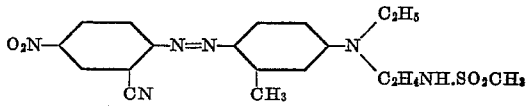

References Cited in the file of this patent

UNITED STATES PATENTS

| | | |
|---|---|---|
| 2,168,337 | Heckert | Aug. 8, 1939 |
| 2,220,129 | Stott | Nov. 5, 1940 |
| 2,261,175 | McNally | Nov. 4, 1941 |
| 2,346,508 | Richardson | Apr. 11, 1944 |
| 2,638,403 | Stead | May 12, 1953 |
| 2,714,104 | Chenicek | July 26, 1955 |
| 2,757,173 | Dickey | July 31, 1956 |
| 2,794,834 | Randall | June 4, 1957 |

OTHER REFERENCES

Venkataraman: The Chem. of Synthetic Dyes, vol. 1, Academic Press, Inc. N.Y., 1952, p. 274.

Vickerstaff: The Physical Chem. of Dyeing, Intersci. Pub. Inc., N.Y., 1954, p. 15.

Zimmerman et al.: Am. Dyestuff Reporter, Apr. 25, 1955, p. P296.